(12) United States Patent
Todd et al.

(10) Patent No.: US 11,308,076 B2
(45) Date of Patent: Apr. 19, 2022

(54) DYNAMIC SCORING IN DATA CONFIDENCE FABRICS

(71) Applicant: EMC IP Holding Company LLC, Hopkinton, MA (US)

(72) Inventors: Stephen James Todd, Center Conway, NH (US); Trevor Scott Conn, Austin, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 193 days.

(21) Appl. No.: 16/667,547

(22) Filed: Oct. 29, 2019

(65) Prior Publication Data
US 2021/0124727 A1    Apr. 29, 2021

(51) Int. Cl.
*G06F 16/23*    (2019.01)
*G06F 16/22*    (2019.01)

(52) U.S. Cl.
CPC ...... *G06F 16/2365* (2019.01); *G06F 16/2237* (2019.01)

(58) Field of Classification Search
CPC ............. G06F 16/2365; G06F 16/2237; G06F 16/2358
See application file for complete search history.

(56) References Cited

U.S. PATENT DOCUMENTS

2010/0281061 A1* 11/2010 Chen ................ G06F 16/2365
707/794

OTHER PUBLICATIONS

Harbor, IOTA Collaborates With Industry-Leading Organizations on Rebuilding Our Trust in Data, pp. 1-3, Oct. 28, 2019.*

* cited by examiner

*Primary Examiner* — Albert M Phillips, III
(74) *Attorney, Agent, or Firm* — Workman Nydegger

(57) ABSTRACT

A data confidence fabric (DCF) is disclosed. The DCF may include a static configuration layer, a dynamic trust insertion layer, and a programmable scoring layer. The DCF may also include edge devices and applications that use the ingested data in some instances. The operation of the DCF allows data to be ingested and associated with a confidence or trustworthiness score. The confidence score can be used by applications that desire access to and use of the ingested data.

18 Claims, 8 Drawing Sheets

DYNAMIC SCORING IN DATA CONFIDENCE FABRICS

FIELD OF THE INVENTION

Embodiments of the present invention generally relate to systems and methods for scoring or ranking data. More particularly, embodiments of the invention relate to systems, hardware, software, computer-readable media, and methods for scoring or ranking data that flows within a system such as a data confidence fabric.

BACKGROUND

Computing and other electronic devices come in a variety of types and form factors and have varying capabilities. Many of these devices generate data that may be used by various applications. There is often a question, however, about the value of the data. More specifically, the trustworthiness of the data may be difficult to ascertain.

However, the ability to score or rank data that flows or is distributed in a computing system has proved difficult for a number of reasons. A few reasons include: the manner in which the score or rank is determined is conventionally limited by the manner in which a score may be calculated; the use of computing resources to compute a trust value may negatively impact the use of computing resources; or the scores given to the data are often not indicative of the data's trustworthiness to an application. In other words, many of the scores do not provide an application with sufficient context to an application that may be using the scores. An application, for example, may not have visibility into how or why the scores were given. The trust score, by itself, does not identify failures, does not address what criteria were not satisfied, or identify where trust insertion failed.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to ecosystems such as data confidence fabrics (DCFs). In one example, a DCF is a system of hardware (computers, servers, routers, network interface cards, storage including immutable storage) that is provisioned to score or rank data that may be ingested into the DCF. The data ingested into the DCF can be made available to applications, which may also be part of the DCF.

In one example, a DCF, by way of example and not limitation, may relate to both hardware and/or software and/or services. A data confidence fabric is an example of an architecture and set of services that allow data to be ingested into a system for use by applications. The DCF adds or provides trust information or scores to the data as the data flows through the DCF. Ultimately, the ingested data is associated with a trust or confidence score that provides a view into the trustworthiness of the data to an application or other use.

More particularly, at least some embodiments of the invention relate to systems, hardware, software, computer-readable media, and methods for implementing data confidence fabrics and to scoring or ranking data that flows between data sources and applications in a data confidence fabric.

As data flows from data sources to storage or to applications in a DCF ecosystem, scores can be attached or associated with the data. As the data flows in the DCF, different forms of trust insertion technology handle or process the data. As the data is handled by various forms of trust insertion technology, the overall score or ranking (e.g., a confidence or trustworthiness score) of the data may change. The data scored or ranked in the DCF system may be stored in various locations, such as a data lake, in a datacenter or the like. The data scored or ranked in the DCF system can be made available to one or more applications or other clients or users.

By ranking or scoring data, an application is able to explore or exploit the data for potential analysis or consumption. The score or rank of the data allows an application to understand or account for the trustworthiness of the data. For example, the confidence score of the data may have a significant impact on whether the data is actually used by the application. An application may require a minimum confidence score or have other requirements related to the confidence score.

For example, an application operating in a nuclear facility may need to use data that is very trustworthy (have a high confidence score) while an data that is used by an application to control lights in a home may not need to be as trustworthy (a lower confidence score is acceptable). A DCF is able to give or associate data with scores from individual trust insertion technologies that can be combined in multiple ways to determine a final score or rank that relates to the trustworthiness of the data.

Figure 1:
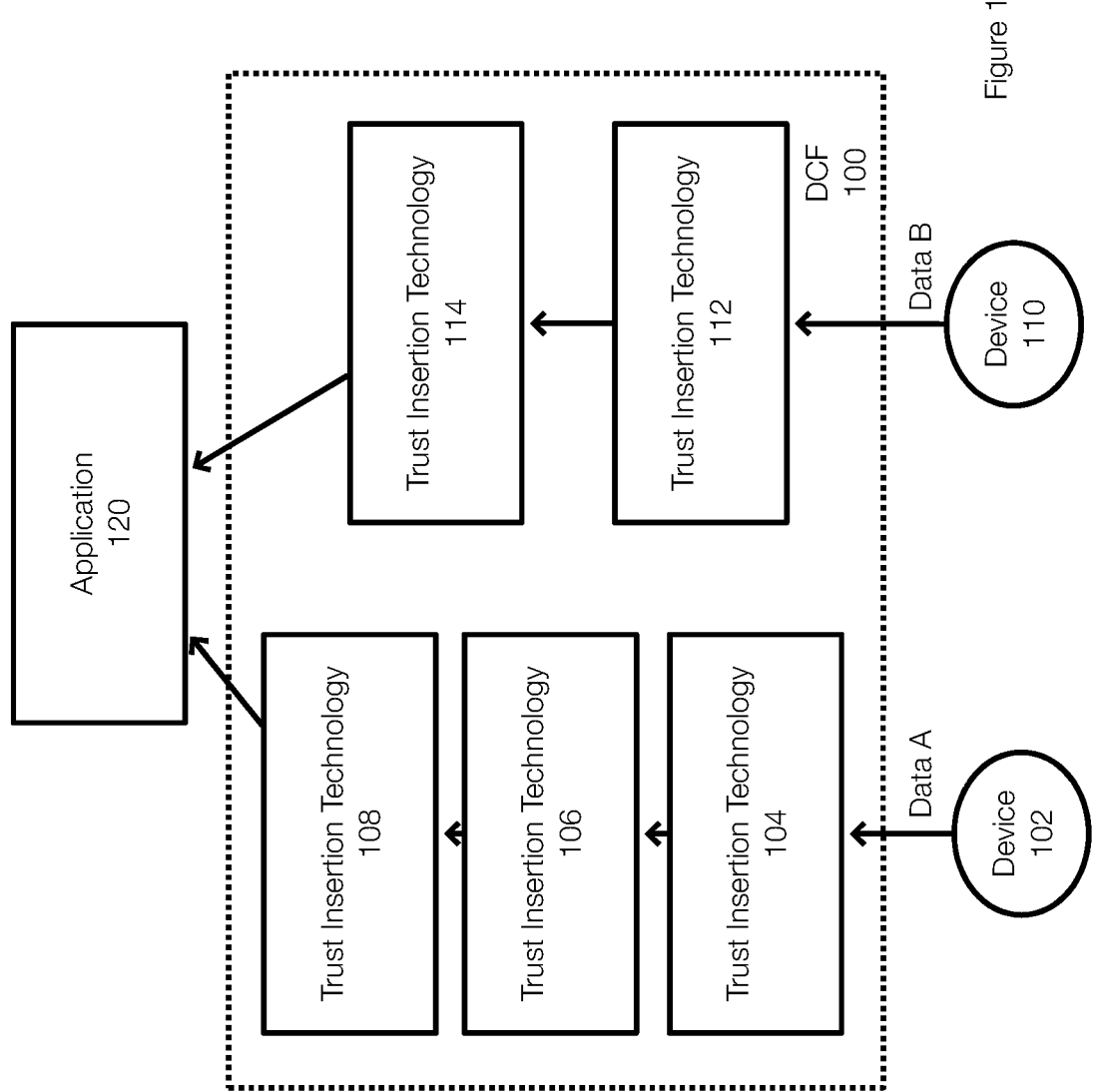
FIG. 1 illustrates an example of a data confidence fabric that is configured to score or rank data that flows through the data confidence fabric.

FIG. 1, for example, illustrates an example of data that flows through a DCF system. In FIG. 1, data A is generated by a device 102 and data B is generated by a device 110. The devices 102 and 110 may by any type of device that generates data. Example devices include sensors, computing devices such as smartphones, laptops, and other devices. IoT (Internet of Things) capable devices are also examples of the devices 102 and 110. The data A and the data B are ingested into a DCF 100 and flow through the DCF 100. In one example, the devices 102 and 110 and the application 120 may be part of or associated with the DCF 100. After flowing through the system, the data A and the data B may be stored in a repository that can be accessed by the application 120. The data A and the data B may also be stored at various locations while flowing through the DCF 100.

The DCF 100 may be implemented on a wide variety of devices and networks. When data is collected on an edge of a network, the data may flow through various levels of hardware environments that have various levels of processing, memory, and storage capabilities. From a hardware perspective, the data may flow from the data-generating device 102 to a server computer or to a gateway device. The server computer or gateway may send the data to another server that is configured to aggregate data from multiple gateways. That server may send the data to a storage environment where the data can be accessed and used by applications. In this path, different devices, services, or applications may handle or process the data. Typically, each interaction with the data may be associated with a trust insertion, where trust data is inserted with or associated with the ingested data. When the data reaches the application or is stored, the data is thus stored or associated with a trust or confidence score. The data and/or the associated score may be scored immutably.

In this example of FIG. 1, each of the devices and/or services and/or applications that handle the data may adjust or change the trustworthiness of the data. This is often achieved by contributing to the score of the data. More specifically, in one example, this is achieved by providing a score that impacts the trustworthiness score or rank of the data. Typically, the scores are cumulative: each trust insertion technology contributes to the overall confidence score. Embodiments of the invention allow the score or rank to be computed using more than simple addition. Other formulations may also be implemented, such as multiplication, addition, weighting, and/or combination thereof or the like.

In FIG. 1, as previously stated, the devices 102 and 110 are examples of data generators. The device 102 generates data A and the device 110 generates data B. The devices 102 and 110 may be sensors, smartphones, tablets, or other computing devices that generate data that is ingested into the DCF 100.

In FIG. 1, the data A may be handled or processed by three different trust insertion technologies 104, 106 and 108 in this example. The DCF 100 can have any number of trust insertion technologies. The data B may be handled or processed by two different trust insertion technologies 112 and 114. In this example, the score or rank of the data A may be higher than the score or rank of the data B. From the perspective of the application 120, the data A may be more trusted than the data B. However, this may depend on the specifics of the trust insertion technologies. For example, a score provided by the trust insertion technology 114 may by substantially higher or heavily weighted. This may influence the overall score or rank of the data B.

Alternatively, if the trust insertion technologies 104 and 106 are the same as the trust technologies 112 and 114, the score or rank of the data A is likely to be higher than the score of the data B because the data A is also scored or ranked by the trust insertion technology 108. This may indicate, for example, that a trust insertion technology failed with respect to the data B.

In the ecosystem illustrated in FIG. 1, embodiments of the invention allow a score to be computed using different calculations. The overall score can be determined from the individual scores using addition, multiplication, weighting, other scoring algorithms, or the like or combination thereof.

Figure 2:
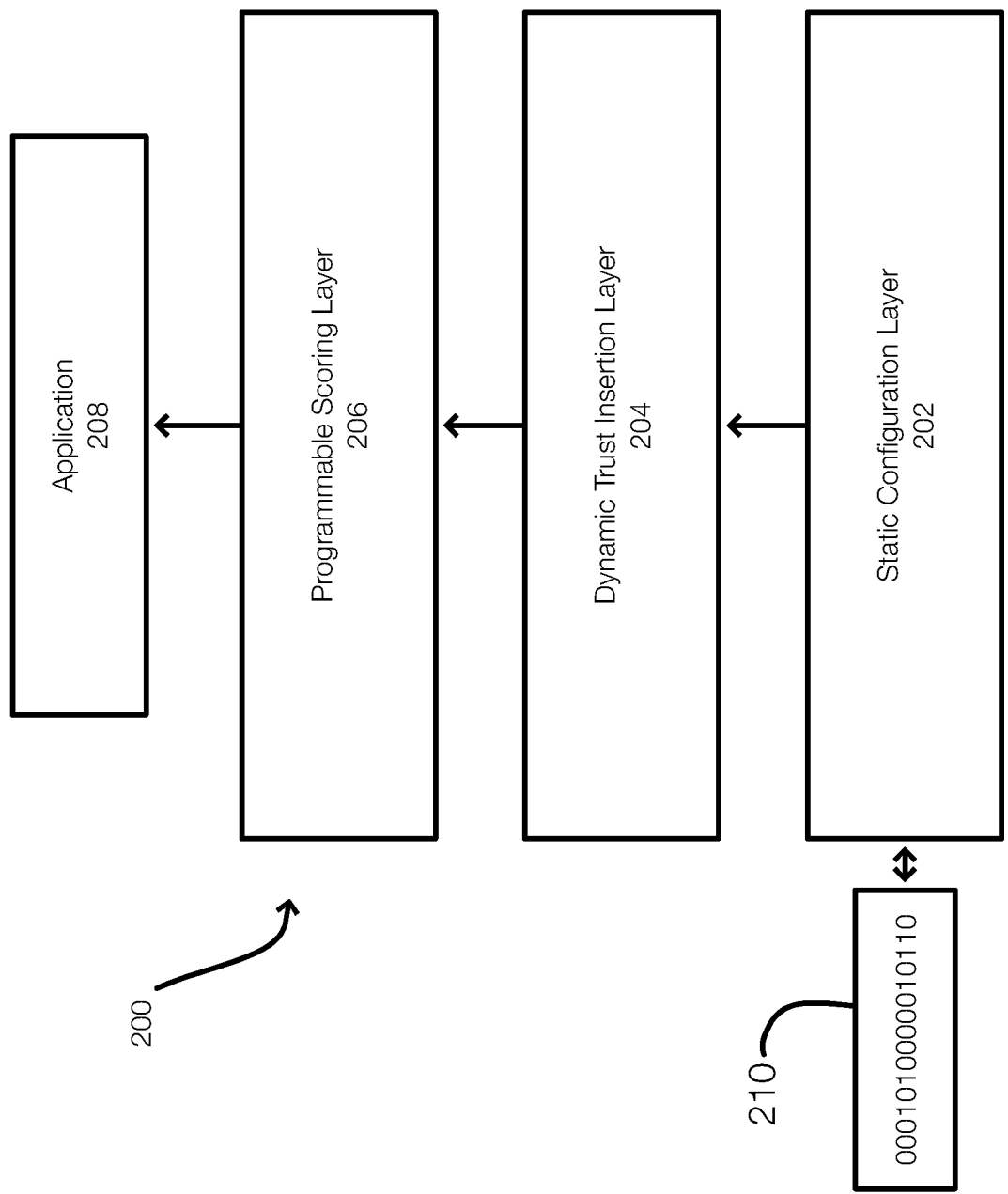
FIG. 2 illustrates an example of a dynamic scoring framework for a data confidence fabric.

FIG. 2 illustrates an example of a DCF that may be implemented in a computing environment or computing system. The DCF can be implemented over closed networks (e.g., within a system such as a factory, business, a single LAN or the like). The DCF could also be implemented in situations that are more open and that may involve various network communications such as cellular, WAN and/or LAN communications. A DCF can be implemented, for example, for IoT networks.

The DCF 200 is an example of a framework that can score data. The DCF 200 includes a static configuration layer 202 that can be leveraged by a scoring mechanism. The DCF configuration layer 202 (or layer 202) The layer 202 may contain or have access to information about the trust insertion technologies that are in use in the DCF 200 as confidence or trust information is added. The layer 202 may also contain information about the trust information technologies.

In one example, the layer 202 is associated with or holds or stores a trust configuration structure 210 that tracks the trust insertion technologies being used for data being ingested into the DCF 200. The trust configuration structure 210 can be used or applied to discrete data or to data streams. In this example, the trust configuration 210 includes a number of bits, by way of example only. Each bit may correspond to a trust insertion technology. The trust configuration 210 can be adapted over time to accommodate additional trust insertion technologies or the like. Further, there is no requirement that all trust insertion technologies represented in the trust configuration 210 be in use in the DCF 200.

In this example, the trust configuration structure 210 may track or identify the trust technologies that are to be used for certain data. More specifically, the trust configuration structure 210 illustrates that the trust insertion technologies associated with bits (bit 0 is the right most bit) 1, 2, 4, 10 and 12 will be used during the DCF trust ingestion process. Zeros in the trust configuration 210 may indicate that the corresponding trust insertion technologies will not be used for the DCF ingestion process or are not available.

The trust configuration structure 210 can also be changed. Bits can be set or unset at any time. As trust insertion technologies change in the DCF system or are added or removed, or upgraded, the trust configuration structure 210 can be updated accordingly.

The following table is an example of trust insertion technologies that may, by way of example only, be associated with a DCF. The trust insertion technologies are not limited to those identified below. The reserved bits, in addition, may be client or user specific. Further, the size of the trust configuration structure is not limited.

In this example, each trust insertion technology corresponds to one of the bits in the structure 210.

Bit 0—Hardware-assisted signatures at creation (TPM is an example of hardware assisted signatures).
Bit 1—Software assisted signatures at creation.
Bit 2—Reading received over HTTPS.
Bit 3—Application subscribes for reading over HTTPS.
Bit 4—Ingest platform verifies signature
Bits 5-9—reserved.
Bit 10—Application received reading via HTTPS.
Bit 11—Application was authorized by ingest platform.
Bit 12—Application verifies signature of event according to public key.
Bit 13—Batched event signature.
Bit 14—Immutable storage trust insertion.
Bit 15—Immutable ledger trust insertion.

In this example, bits 0-3 may correspond to trust insertion technologies associated with the edge data and/or to the generation of the edge data. For example, bits 0 and 1 may identify whether the data was signed using a private key, which can then be verified using the corresponding public key. Bits 4-9 may be related to on-premise or to trust insertion technologies inside the DCF. Bit 4, for example, may identify whether the ingest platform associated with the DCF verifies the signature previously applied to the ingested data. Bits 10-15 may relate to how the data is stored in the cloud or other location. Bit 15, for example, may relate to the use of a ledger or blockchain technology. A ledger can record, for example, a hash of the data or the like such that the data can be verified using the ledger.

Figure 3:
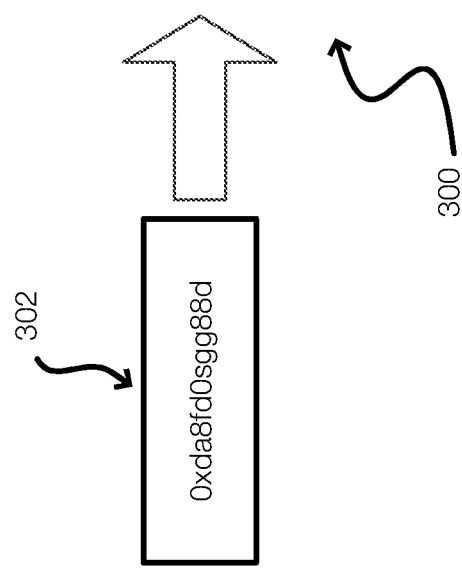
FIG. 3 illustrates an example of a static configuration layer for a data confidence fabric.

FIG. 3 illustrates an example of a configuration table used during the ingestion process. FIG. 3 illustrates a table 300 that identifies the specific technologies used when ingesting data. The table 300 may identify a bit position 304 and a technology description 306. The technology description 306 identifies a specific technology while the trust configuration structure 210 may identify the trust insertion technology more generally.

FIG. 3 also illustrates a trust insertion array pointer 302. The pointer 302 can be appended to the data being ingested as the data flows through the DCF system. The pointer 302 may also be or include a hash of the table 300. The pointer 302 can be appended to the data being ingested rather than appending the table 300 to the data. The pointer 302 minimizes or prevents the trust insertion technologies from being tampered with. The pointer 302 may point or refer to a location where, for example, a data scientist or forensic expert, or other user can access the table and identify the trust insertion technologies actually used or actually available. The table 300 may be stored in an object store or in a ledger, for example. As previously stated, the pointer 302 may be used as a hash to verify that the table 300 has not been tampered with.

When the trust insertion technologies associated with the DCF have been configured, a weighting table may also be associated with the layer 202. The weighting table allows the scores associated with the trust insertion technologies to be weighted. This allows, for example, other calculations to be performed when determining an overall rank or score of ingested data. The weighting table, such as the weighting table 406 shown in FIG. 4, associates weights with specific insertion technologies. In this example, a higher weight may be given to trust insertion technologies that may be more critical than other trust insertion technologies. In this example, the importance of trust insertion closer to the data supplying device is emphasized compared to trust insertion that occurs closer to the application.

Figure 4:
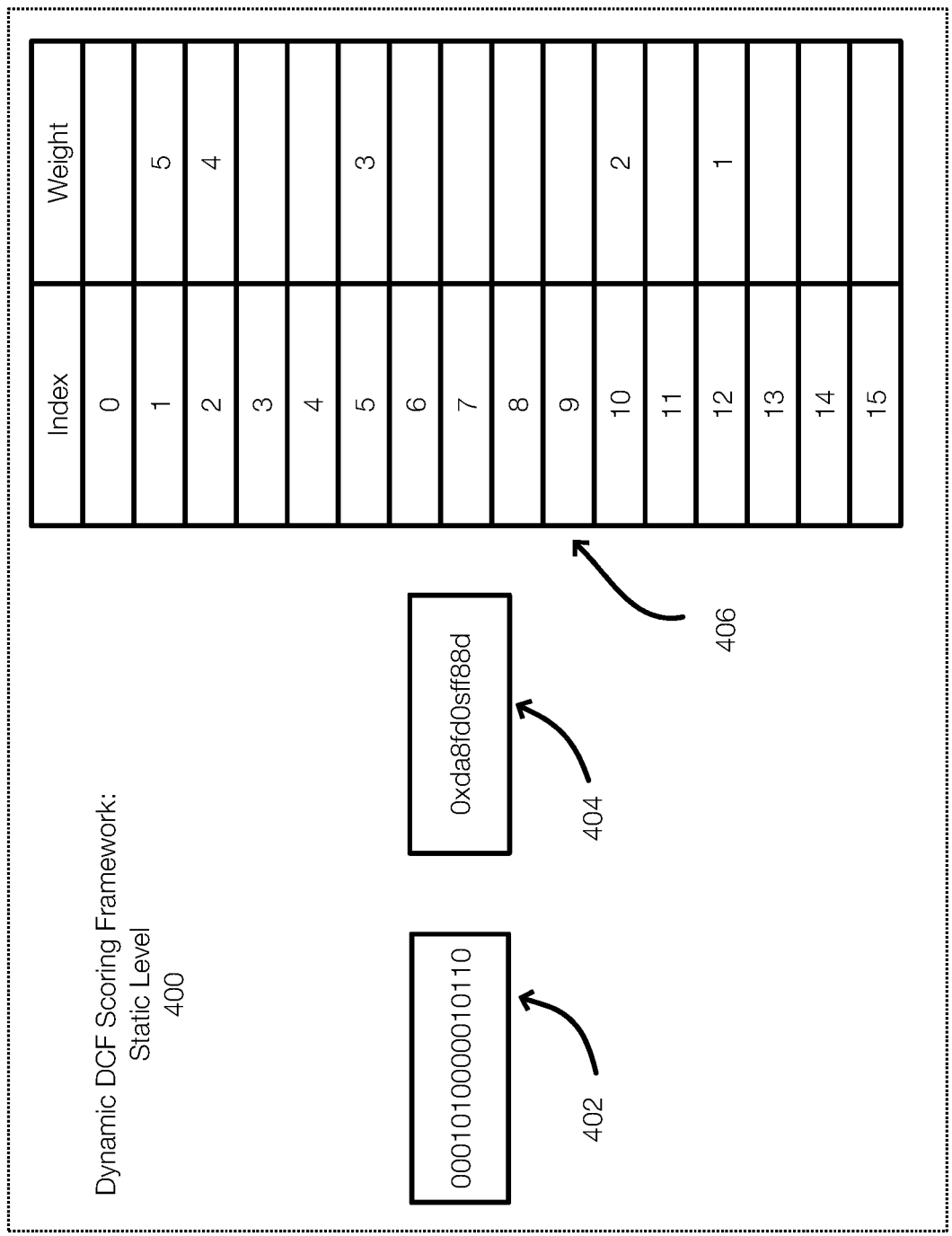
FIG. 4 illustrates an example of a dynamic trust insertion layer for a data confidence fabric.

FIG. 4 illustrates an example of a dynamic DCF scoring framework associated with the static layer 202. The framework 400 includes, by way of example only, a trust insertion configuration structure 402, a trust array pointer 404 and a weighting table 406. As previously stated, the trust insertion configuration 402 identifies the trust insertion technologies that are being applied at any given period or instant of time. Also, the trust insertion array pointer, as previously stated, is a tamper-resistant way to refer to the currently-configured trust insertion technologies in use. The weighting table 406 can be used to give more value or emphasis to certain trust insertion technologies. This can be done on a variety of bases, such as nearness to data source, nearness to storage, industry reputation, or the like or combination thereof. FIG. 4 thus illustrates an example of a static level 202 of a DCF scoring framework that can be implemented in a DCF.

Figure 5:
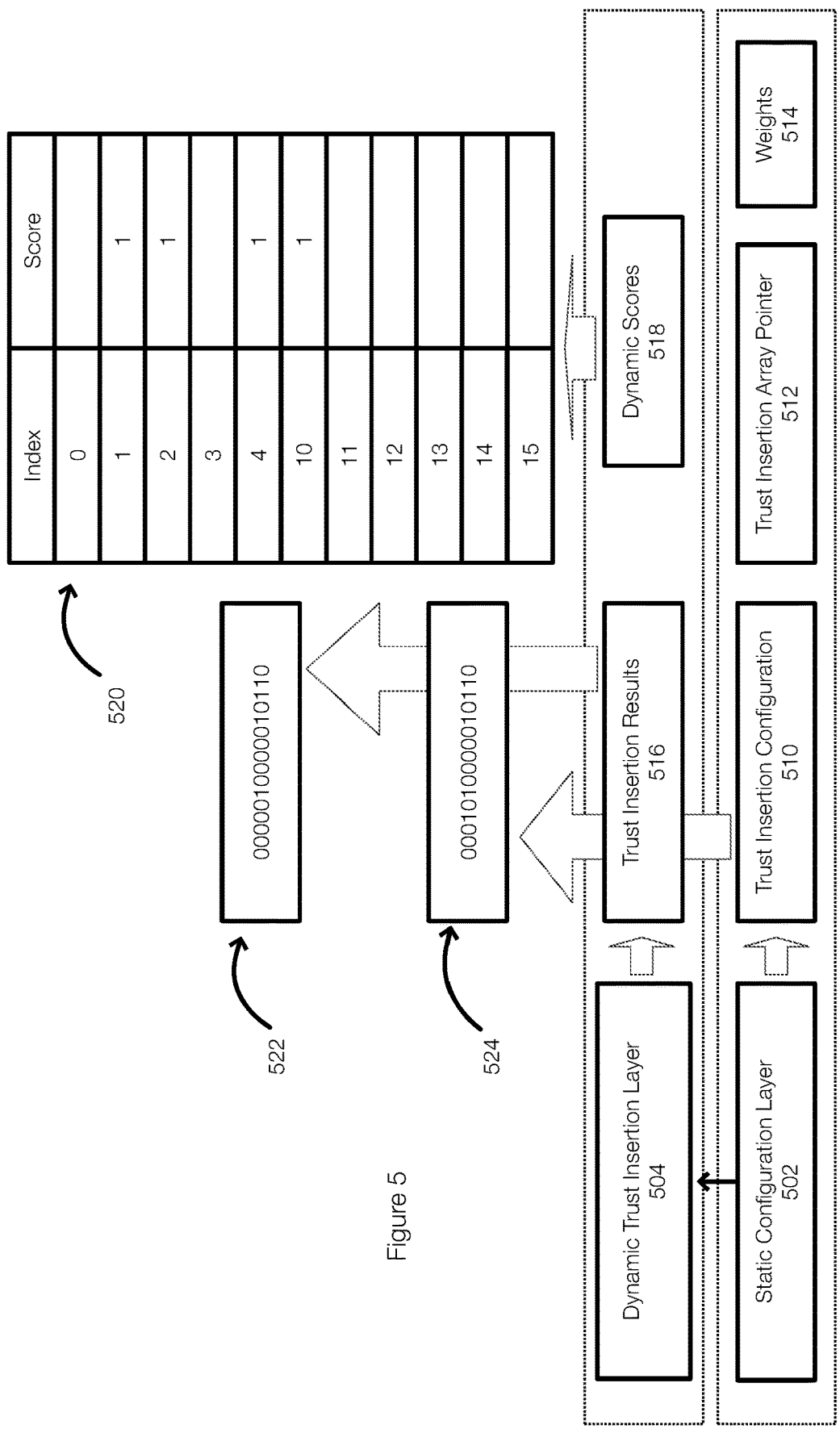
FIG. 5 illustrates an example of scoring results in a data confidence fabric.

FIG. 5 illustrates a portion of the DCF framework including the static configuration layer 502 and the dynamic trust insertion layer 504. FIG. 5 illustrates an example of part of the framework illustrated in FIG. 2. FIG. 5 illustrates that the trust insertion layer 504 is leveraged by the DCF framework through the creation of status results coming from the various trust insertion technologies or from each trust insertion layer.

The dynamic trust insertion layer 504 is associated with trust insertion results 516 and dynamic scores 518. The table 520 is an example of the dynamic scores 518, the results 522 are an example of the trust insertion results 516 and the configuration 524 is an example of the trust insertion configuration 510.

As data flows through a DCF and trust scores are generated and inserted into the table 520, the DCF framework can track the completion of trust insertion results. This may be achieved using the bitmap or the trust insertion configuration 510. Each time a trust insertion technology is invoked and successfully completed, the appropriate bit is set in the trust insertion results 516 for the ingested data. If the trust insertion technology fails to execute, the bit in the trust insertion results 516 is not set.

FIG. 5 illustrates an example of a scenario where device data was signed, but the application was unable to validate the signature using the available public key. The trust insertion layer 504 is able to highlight this discrepancy. More specifically, the trust configuration 524 illustrates that the fourth bit from the left is set, which indicates that specific trust insertion technology. The corresponding bit in the trust insertion results 522 is not set, which indicates that the trust insertion technology failed.

In addition to the trust insertion results 522, the dynamic scores table 520 can keep track of the confidence or trust score assigned by any given layer or by any given trust insertion technology. In the table 420, a score is provided for the trust insertion technologies associated with bits 1, 2, 4 and 10 in the trust insertion configuration 510. However, because the trust insertion technology associated with bit 12 did not complete or failed, there is no score associated with bit 12 in the table 520 in this example. In one example, the score is a 1. However, other numbers of fractions could also be used to record the score for any of the trust insertion technologies. Further the scores could also be normalized.

In this example, 5 trust insertion technologies were configured to be used. However, a score was only calculated for four of the five trust insertion technologies. In another example, a score of 0 or a negative score could be entered for trust insertion technologies that fail to execute for any reason. Trust insertion technologies that are not available or are not used may not contribute to the confidence score.

FIG. 5 illustrates the manner in which the static configuration layer 502 and the dynamic trust insertion layer 504 cooperate and interact to not only define the trust insertion technologies used in the DCF but also generate and record scores for the configured trust insertion technologies.

Figure 6:
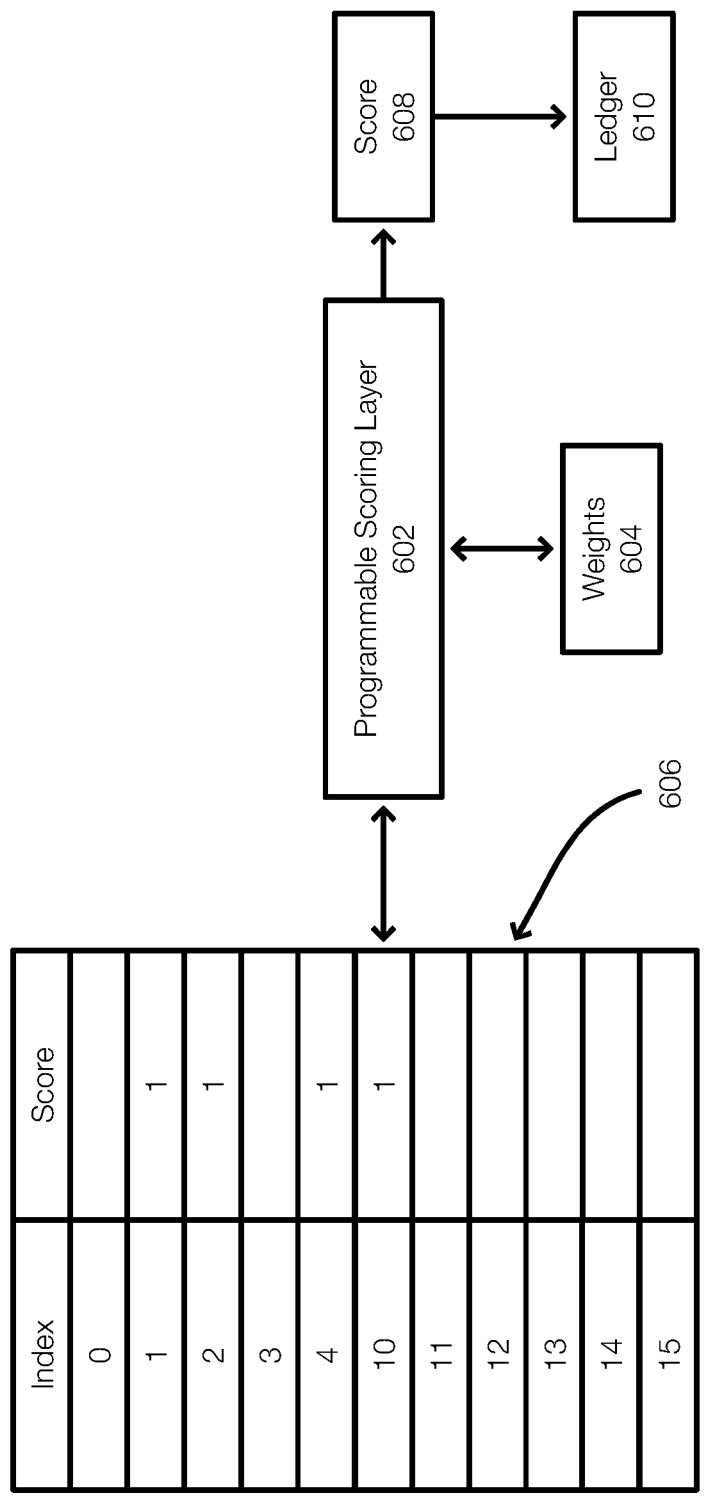
FIG. 6 illustrates an example of a programmable scoring layer in a data confidence fabric.

FIG. 6 illustrates an example of a programmable scoring layer 602, which is an example of the programmable scoring layer 206 shown in FIG. 6. In this example, inputs to the programmable scoring layer 602 may include a scoring table 606 and weights 604. In this example, if only the scoring table 606 is used, the rank or score may be determined by summing the scores. This results in a score 608 of 4 (score=1+1+1+1). If the weights 604 (such as shown in FIG. 5 are taken into account, the score 608 may be 14 (score=1× 5+1×4+1×3+1×2). Other scoring algorithms are allowed.

The results, scores or rankings generated by the DCF system can be stored in a ledger 610. The ledger entry 610 can include, in addition to the final score, an entire set of data structures and the programmable scoring algorithm. The score can be generated, for example, when the ledger entry is created or at another time. By storing the algorithm and the data structures (e.g., the trust insertion configuration 510, the weights 514, the trust insertion results 516, the dynamic scores 518, or the like), additional use cases are enabled.

For example, the results may be revisited for further analysis, correction, or for other reasons. This allows an entity (e.g., a business or other owner or application) to change the weightings used in generating the confidence scores, alter the confidence scores that came from a trust insertion technology, or the like. In addition, new algorithms can be generated to create different confidence scores or companion confidence scores. For example, the scoring algorithm can be adapted to various equations, examples of which include addition and/or multiplication and/or weighting.

In addition, failed trust insertions can be detected in the DCF. This allows embodiments of the invention to evaluate the various bitmaps (e.g., the trust insertion configuration and the trust insertion results) and set a different score. For example, if a trust insertion score is missing, the entire confidence chain can be null or zero. Alternatively, a weighted penalty could be leveraged against the failed trust insertion.

In addition, embodiments of the invention provide improvements to the operation of computing systems such as DCF systems. As previously described, embodiments of the invention allow multiple approaches to be implemented in order to determine a confidence score. This allows insertion technologies that are deemed more critical to be given more influence on the overall confidence score. Embodiments of the invention also allow the score to be computed after ingestion rather than (or in addition to) inflight calculations. This relieves, for example, hardware challenged environments of the computational burdens associated with scoring.

In addition, embodiments of the invention also allow an application to have a better understanding of any individual confidence score at least because the overall confidence score is related to all of the trust insertion technologies.

An application also has access to specific scores and can know or understand how trust insertion failures were handled. An application can understand, for example, that an available trust insertion technology failed. More specifically, this also allows the application to decide how to handle trust insertion failures. The application can be made aware of whether the failed insertion contributed to the overall score, did not contribute a positive score, or contributed a negative score. The application may also choose to disregard data where any one insertion technology fails.

When calculating scores, certain policies can also be implemented in addition to scoring methodologies. For example, insertion failures can be ignored or the entire confidence score is 0 or docked when one insertion technology fails or when a specific insertion technology fails.

Embodiments of the invention also allow for the correction of faulty, incorrect or malicious scoring (referred to as faulty scoring). The ledger entry, as previously stated, may contain the entire record of the trust insertion or data ingestion process in addition to the overall confidence score. If a type of faulty scoring is discovered (e.g., it is discovered that a trust insertion technology has been inserting incorrect or invalid confidence scores), the scores can be revisited and recalculated.

In another example, confidence scores can be static. For example, digitally signing data using a private key may always give the same score. However, some confidence scores may be on a spectrum. For example, a thermostat may report a reading in a known outdoor climate and may have or be given full confidence when the reading is in a reasonable range. The confidence score may fluctuate if the reading approaches unlikely or impossible ranges. For example, a high temperature reading of 15 degrees Fahrenheit in an area that forecast a high of 70 degrees Fahrenheit may be given a low confidence score. Advantageously, these scores can be revised at any time after the event of interest.

Using the DCF system discussed herein, there is visibility into why certain trust technologies failed. In fact, the specific trust technologies that failed can be identified. This visibility allows the path of the data to be reconstructed and evaluated. The table 300, for example, can be used to track the flow of the data in the DCF system and to identify the specific trust technologies and other metadata (version, time stamps, and other metadata).

As data is ingested into a DCF system, the trust insertion technologies may insert trust or confidence scores as discussed herein. In addition, other data may be added. For example, ingested data may be signed by the device or by a gateway. In addition, information about the context of the reading (source, ingest environment, may be appended to the data along with a pointer as previously described.

In one example, a DCF may be associated with an ingest platform that provides strong authentication and authorization. This ensures that only specific applications can tap into the data stream, and allows a confidence score to be inserted. The reading or ingested data may be stored in immutable edge storage platform. A pointer to the storage platform may be placed in the ledger entry along with other trust metadata.

Embodiments of the invention allow an application to explore data assets for potential analysis with an understanding of the trustworthiness of the data assets.

Figure 7:
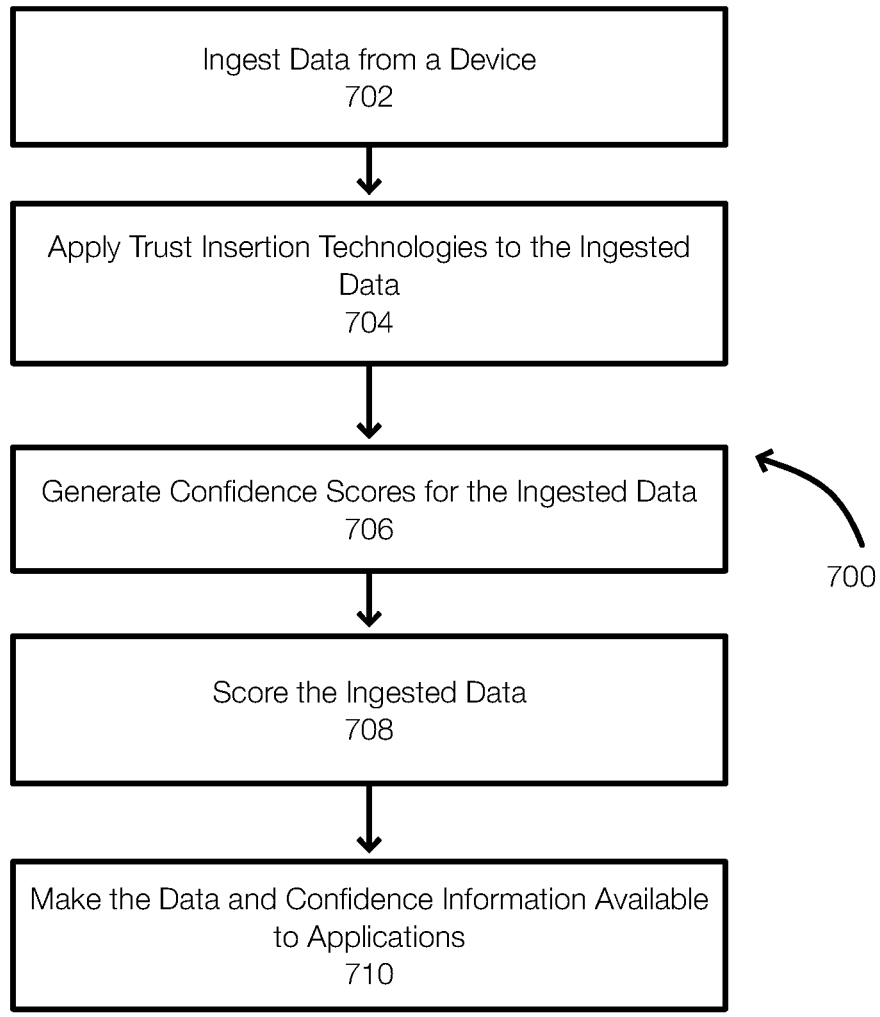
FIG. 7 illustrates an example of a method for ingesting data into a data confidence fabric.

FIG. 7 illustrates an example of a method for ingesting data into a data confidence fabric. The method 700 may begin by ingesting 702 data from a device. The device may be an edge device or the like. In addition, the device may apply a trust insertion technology to the data generated by the device. The device may sign the data, for example.

Next, trust insertion technologies are applied 704 to the ingested data. Examples of trust insertion technologies may include digitally signing the data (by the device or a gateway). Context data about the ingested data or the reading can be provided and appended to the data. Provenance information or context information may include the source, ingest environment, provenance, or the like or combination thereof. In one example, the ingest platform may apply or append the provenance data to the ingested data. An ingest platform such as EdgeX Foundry, may provide strong authentication and authorization such that only certain applications can tap into the data or the data stream. Another trust insertion technology is to store the data on an immutable edge storage platform. Next, a pointer to the storage platform may be placed in a ledger entry, along with other trust metadata, including the overall confidence score of the data. The various data and structures discussed herein may be included in the ledger entry.

Next, confidence scores are generated 706 for the ingested data. The scores may be generated as the trust insertion technologies are applied. When successfully performed, an entry may be made in the scoring table as previously described. The ingested data can then be scored 708. Scoring the ingested data may include generating the overall confidence score and may include storing the confidence information (e.g., tables, individual scores, DCF configuration, and the like) in the ledger entry.

Optionally, the data and the confidence information is made available 710 to applications. The applications can evaluate the confidence scores and decide whether the data is sufficiently trustworthy. Each application may have its own standards.

Figure 8:
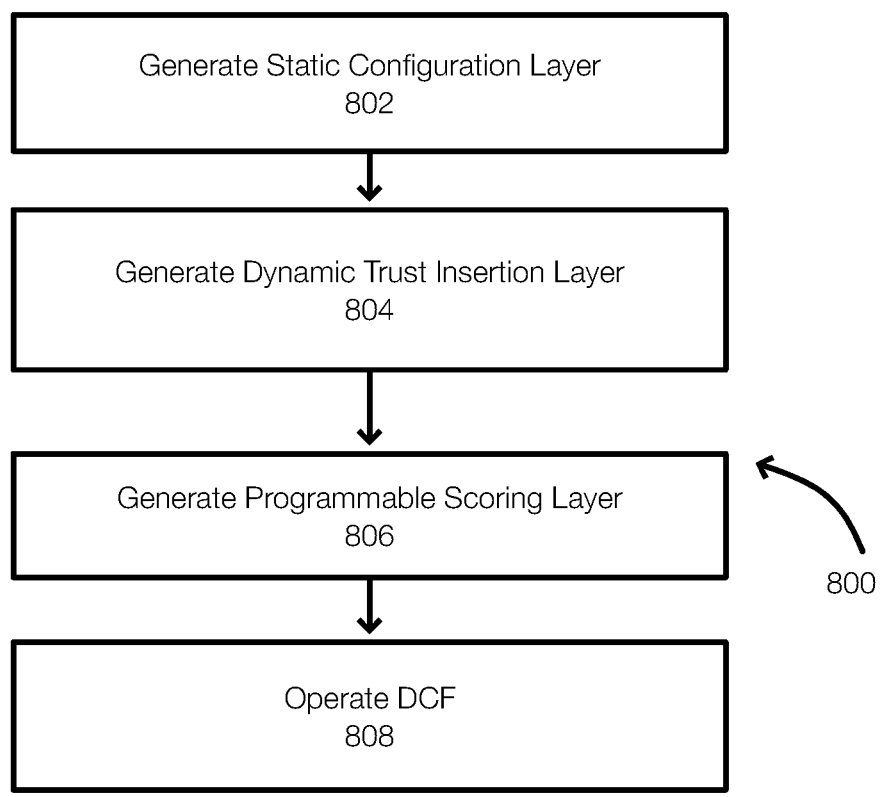
FIG. 8 illustrates an example of a method for generating and operating a data confidence fabric.

FIG. 8 is an example of a method for provisioning a data confidence fabric. Some of the elements of FIGS. 7 and/or 8 can be performed concurrently. Further, some embodiments may include fewer elements.

Initially, a static configuration layer 802 is generated and deployed for a DCF. This may include identifying and deploying trust insertion technologies, establishing data structures such as a trust configuration, a trust technology array and associated array pointer, a weighting table and the like.

Next, the dynamic trust insertion layer is generated 804 and deployed. This may include establishing trust insertion results to record the trust insertion technologies that were successfully applied, a scoring table for storing dynamic scores, or the like.

A programmable scoring layer is also generated 806. The programmable scoring layer uses the dynamic scores and the weighting table, by way of example, to generate a confidence score.

Once these layers of the DCF are established and in place, the DCF is operated. Data is ingested and scored. During this process, information about the data is also stored, for example in a ledger as described previously. This allows the confidence scores, the trust configuration and insertion structures, specific scores, and the like to be reviewed, adjusted, or otherwise processed. In addition, the DCF can make the data available for applications to use.

The diagrams provided in this disclosure can be interpreted as both structure and methods. Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data confidence fabric operations. Such operations may include, but are not limited to, scoring operations, forensic operations, trust insertion operations or the like or combination thereof. More generally, the scope of the invention embraces any operating environment in which the disclosed concepts may be useful.

At least some embodiments of the invention provide for the implementation of the disclosed functionality in existing ingestion platforms, such as EdgeX Foundry. In general however, the scope of the invention is not limited to any particular computing platform or data storage environment or data ingestion platform, storage configuration, or the like.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage. Storage may include data lakes or the like.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), sensors, computing devices, data generating devices, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Embodiment 1. A method, comprising ingesting data into a data confidence fabric, wherein the data confidence fabric includes hardware, software, and applications for processing the ingested data, applying trust insertion technologies to the ingested data by the data confidence fabric, wherein a trust insertion structure determines which of the trust insertion technologies successfully inserted trust and each successfully inserted trust is associated with a score, and/or scoring the ingested data with a confidence score based on at least the scores of trust insertion technologies that successfully inserted trust.

Embodiment 2. The method according to embodiment 1, further comprising setting a trust configuration structure that identifies the trust insertion technologies operating in the data confidence fabric.

Embodiment 3. The method according to embodiment 1 and/or 2, further comprising comparing the trust configuration with the trust insertion structure to identify which of the trust insertion technologies failed to insert trust.

Embodiment 4. The method according to embodiment 1, 2 and/or 3 further comprising setting weights in a weighting table for each of the trust insertion technologies, wherein the confidence score is based on the scores and the weights in the weighting table.

Embodiment 5. The method according to embodiment 1, 2, 3, and/or 4, further comprising appending provenance metadata to the ingested data.

Embodiments 6. The method according to embodiments 1, 2, 3, 4, and/or 5, further comprising appending a pointer to the ingested data, wherein the pointer points to an array that identifies the trust insertion technologies.

Embodiment 7. The method according to embodiment 1, 2, 3, 4, 5, and/or 6 wherein the array includes a hash of the array pointed to by the pointer.

Embodiment 8. The method according to embodiment 1, 2, 3, 4, 5, 6, and/or 7, further comprising storing confidence information in a ledger entry, the confidence information including one or more of the trust configuration structure, a trust insertion structure, a weighting table, a scoring table, an insertion technology array, the scores, the confidence scores, or combination thereof.

Embodiment 9. The method according to embodiment 1, 2, 3, 4, 5, 6, 7, and/or 8, further comprising adjusting at least a part of the confidence information when a fault is discovered in the data confidence fabric.

Embodiment 10. The method according to embodiment 1, 2, 3, 4, 5, 6, 7, 8, and/or 9, further comprising changing the trust configuration structure, a trust insertion structure, a scoring array, a weighting table in response to changes in the trust insertion technologies.

Embodiment 11. A non-transitory computer readable medium comprising computer executable instructions for performing the method of embodiment 1, 2, 3, 4, 5, 6, 7, 8, 9, and/or 10.

Embodiment 12, which may include any elements from embodiments 1-11. A method for operating a data confidence fabric, the method comprising one or more of, generating a static configuration layer, wherein the static configuration layer is associated with a trust insertion configuration structure, a trust insertion array pointer, a trust insertion technology array that identifies the trust insertion technologies, and static weights, generating a dynamic trust insertion layer, wherein the dynamic trust insertion layer is associated with a trust insertion results structure and a scoring table, generating a programmable scoring layer, wherein the programmable scoring layer is associated with a confidence score and an algorithm for generating the confidence score, ingesting data into the data confidence fabric, and operating the data confidence fabric to generation confidence scores for the ingested.

Embodiment 13. The method of embodiment 12, wherein the trust insertion configuration structure comprises a bitmap, wherein each bit in the bitmap corresponds to a trust insertion technology, wherein a set bit indicates that the corresponding trust insertion technology is available in the data confidence fabric, wherein the static weights assigns weights for scores provided by the trust insertion technologies, and where a trust insertion array pointer is appended to the ingested data and points to the trust insertion technology array.

Embodiment 14. The method of embodiments 12 and/or 13, wherein the trust insertion results structure comprises a bitmap whose bits correspond to the bits in the trust insertion configuration structure, wherein set bits in the trust insertion results identifies a successfully completed insertion of trust by the corresponding trust insertion technology.

Embodiment 15. The method of embodiment 12, 13, and/or 14, further comprising, for each successfully completed trust insertion, a score in the scoring table.

Embodiment 16. The method of embodiment 12, 13, 14, and/or 15, further comprising generating the confidence score based on the weighting table and the scoring table.

Embodiment 17. The method of embodiment 12, 13, 14, 15, and/or 16, further comprising storing confidence information in a ledger, the confidence information including one or more of the confidence score, the trust insertion configuration structure, the trust insertion results structure, the pointer, the array, the scoring table, and/or the weighting table.

Embodiment 18. The method of embodiment 12, 13, 14, 15, 16, and/or 17, further comprising providing the confidence scores and the ingested data to applications.

Embodiment 19. The method of embodiment 12, 13, 14, 15, 16, 17, and/or 18, further comprising adjusting the confidence information when faults are determined in the data confidence fabric.

Embodiment 20. A non-transitory computer readable medium comprising computer executable instructions for performing the method of embodiments, 12, 13, 14, 15, 16, 17, 18 and/or 19.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical device including a computing device. As well, where any of the aforementioned elements comprise or consist of a virtual machine (VM) or a container or other implementation, that VM may constitute a virtualization of any combination of the physical components herein.

A physical computing device may include a memory which may include one, some, or all, of random access memory (RAM), non-volatile random access memory (NVRAM), read-only memory (ROM), and persistent memory, or immutable storage one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   ingesting data into a data confidence fabric, wherein the data confidence fabric includes hardware, software, and applications for processing the ingested data;
   appending a pointer to the ingested data, wherein the pointer points to a trust insertion technology array that identifies the trust insertion technologies;
   applying trust insertion technologies to the ingested data by the data confidence fabric, wherein a trust insertion structure comprises a bitmap and determines which of the trust insertion technologies successfully inserted trust and each successfully inserted trust is associated with a score, each bit in the bitmap corresponds to the trust insertion technology with a set bit indicating that the corresponding trust insertion technology is available in the data confidence fabric; and
   scoring the ingested data with a confidence score based on the scores of trust insertion technologies that successfully inserted trust and weights for the scores provided by the trust insertion technologies.

2. The method according to claim 1, further comprising setting a trust configuration structure that identifies the trust insertion technologies operating in the data confidence fabric.

3. The method according to claim 2, further comprising comparing the trust configuration with the trust insertion structure to identify which of the trust insertion technologies failed to insert trust.

4. The method according to claim 1, further comprising setting weights in a weighting table for each of the trust insertion technologies.

5. The method according to claim 1, further comprising appending provenance metadata to the ingested data.

6. The method according to claim 1, wherein the array includes a hash of the array pointed to by the pointer.

7. The method according to claim 1, further comprising storing confidence information in a ledger entry, the confidence information including one or more of the trust configuration structure, a trust insertion structure, a weighting table, a scoring table, an insertion technology array, the scores, the confidence scores, or combination thereof.

8. The method according to claim 7, further comprising adjusting at least a part of the confidence information when a fault is discovered in the data confidence fabric.

9. The method according to claim 1, further comprising changing the trust configuration structure, a trust insertion structure, a scoring array, a weighting table in response to changes in the trust insertion technologies.

10. A non-transitory computer readable medium comprising computer executable instructions for performing the method of claim 1.

11. A method for operating a data confidence fabric, the method comprising:

generating a static configuration layer, wherein the static configuration layer is associated with a trust insertion configuration structure, a trust insertion array pointer, a trust insertion technology array that identifies the trust insertion technologies, and static weights;

generating a dynamic trust insertion layer, wherein the dynamic trust insertion layer is associated with a trust insertion results structure and a scoring table;

generating a programmable scoring layer, wherein the programmable scoring layer is associated with a confidence score and an algorithm for generating the confidence score;

ingesting data into the data confidence fabric; and operating the data confidence fabric to generation confidence scores for the ingested, wherein the trust insertion configuration structure comprises a bitmap, wherein each bit in the bitmap corresponds to a trust insertion technology, wherein a set bit indicates that the corresponding trust insertion technology is available in the data confidence fabric, wherein the static weights assigns weights for scores provided by the trust insertion technologies, and where a trust insertion array pointer is appended to the ingested data and points to the trust insertion technology array.

12. The method of claim 11, wherein the trust insertion results structure comprises a bitmap whose bits correspond to the bits in the trust insertion configuration structure, wherein set bits in the trust insertion results identifies a successfully completed insertion of trust by the corresponding trust insertion technology.

13. The method of claim 12, further comprising, for each successfully completed trust insertion, a score in the scoring table.

14. The method of claim 13, further comprising generating the confidence score based on the weighting table and the scoring table.

15. The method of claim 14, further comprising storing confidence information in a ledger, the confidence information including one or more of the confidence score, the trust insertion configuration structure, the trust insertion results structure, the pointer, the array, the scoring table, and/or the weighting table.

16. The method of claim 15, further comprising providing the confidence scores and the ingested data to applications.

17. The method of claim 15, further comprising adjusting the confidence information when faults are determined in the data confidence fabric.

18. A non-transitory computer readable medium comprising computer executable instructions for performing the method of claim 11.

* * * * *